Sept. 4, 1928.

R. H. CHILTON 1,683,330

SPRING SHACKLE

Filed March 29, 1927

Inventor
Ralph H. Chilton
By Spencer, Hardman & Fehr
his Attorneys

Patented Sept. 4, 1928.

1,683,330

UNITED STATES PATENT OFFICE.

RALPH H. CHILTON, OF DAYTON, OHIO, ASSIGNOR TO THE INLAND MANUFACTURING COMPANY, OF DAYTON, OHIO, A CORPORATION OF DELAWARE.

SPRING SHACKLE.

Application filed March 29, 1927. Serial No. 179,361.

This invention relates to flexible coupling members, especially such as are adapted for use as spring shackles on vehicles.

An object of this invention is to provide an improved form of flexible coupling having the advantages of economy of manufacture, efficiency of operation under all conditions of use, and long life.

A more specific object is to provide a coupling member consisting primarily of elastic soft rubber and flexible rubberized fabric which will permit easy relative movement of the parts connected thereby in one desired direction, but which substantially prevents relative movement at right angles to this desired direction. This is accomplished by providing a wide flexible tension web extending through the central portion of the molded unit and extending transversely to the direction of desired relative movement. Obviously lateral movement or "side sway" between the parts connected by the shackle will put edge loading upon this tension web and will therefore be resisted thereby. This tension web will also take all direct tension loads on the shackle, such as may occur on rebound of the spring. My application, Serial No. 179,360 filed on even date with this application is for a similar type of shackle but with this flexible tension web omitted.

Another object is to provide a shackle seat member for the end of the long leaf of the spring which reinforces the pierced end of the long leaf and provides a very simple and efficient construction.

Further objects and advantages of the present invention will be apparent from the following description, reference being had to the accompanying drawings, wherein a preferred form of the present invention is clearly shown.

In the drawings.

Similar reference characters refer to similar parts throughout the drawings.

Figure 1:
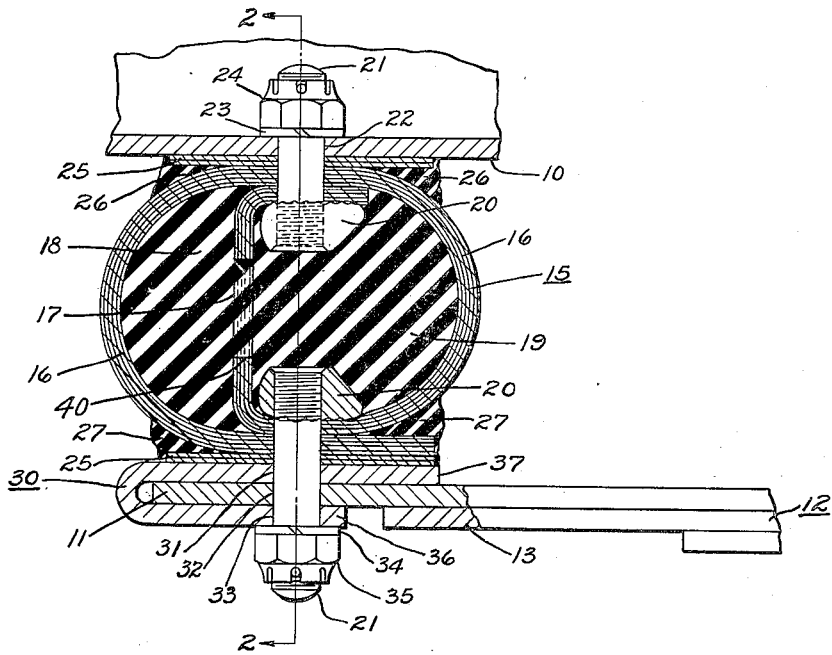
Fig. 1 illustrates a shackle built according to this invention mounted on the rear end of the front spring of an automobile chassis. The vertical section is taken on line 1—1 of Fig. 2.

Numerals 10 and 11 designate the two relatively movable parts connected by the shackle, 10 being the chassis side rail or fitting rigidly secured thereto, and 11 the projecting end of the longest leaf of spring 12.

The molded unit indicated as a whole by numeral 15, comprises a somewhat oval-shaped rubberized fabric casing 16 which preferably is composed of a plurality of layers of rubberized cord-fabric with the substantially non-extensible cords thereof extending peripherally around the casing. The inner end of the cord fabric material, after being coiled to form casing 16, is extended substantially directly across the interior of casing 16 to form a web 17, as clearly shown in Fig. 1. Preferably this web 17 is cut away at its central portion as shown at 40 in Figs. 1 and 2. This renders the web more flexible and permits the flow of soft rubber therethrough if the rubber on one side thereof is compressed more than on the other side during to and fro movement of the spring end. The molded in situ metal clamping inserts 20 have shanks 21, threaded thereto or integral therewith, which project outwardly through suitable apertures in casing 16 and the ends of web 17. In coiling up the cord fabric to the form as shown the metal inserts 20 may be used to aid in holding the fabric in proper position while the unvulcanized rubber material is being inserted in place in a manner which will be understood by those skilled in the art. This rubber material is of such composition that when the molded unit comes from the vulcanizing molds the rubber blocks 18 and 19 will be elastic rubber of the desired softness, such as to permit easy rolling distortion of the molded unit but still capable of sustaining the compressive load thereon without excessive bulging out at the unconfined lateral sides of the blocks. These blocks 18 and 19 are of course firmly vulcanized to the rubberized casing 16 and the tension web 17 and this tends to limit the above mentioned lateral bulging of the elastic rubber. If desired, free metallic side plates may be provided for this molded unit to confine the elastic rubber on its lateral walls with a cross time member extending through block 19 and interconnecting said plates in the manner clearly disclosed in my copending application mentioned above.

Preferably there are integrally molded upon the above described unit the relatively stiff rubberized fabric seats 25 and the wedge shaped spaces 26 and 27 between the seats 25 and the casing 16 are filled with soft elastic rubber molded in place. Preferably these fabric seats 25 are molded with an outwardly concave surface so that when they are flattened out by being clamped in place upon the metal seats by the clamping inserts 20, their fore and aft edges will snugly hug the metal seats and prevent any foreign matter from entering thereunder. This molded unit 15 is vulcanized as a whole in the molding die, the desired degree of softness or hardness of the rubber in various portions thereof being determined by the chemical constituency of the unvulcanized rubber composition used in said various portions. By this means the soft rubber portions 26 and 27 may be vulcanized to a softer degree than the elastic rubber 18 and 19 even though the entire unit is subjected to the same vulcanization process.

In assembling the completed molded unit 15 in place, a U-shaped metal seat member 30 of the full width of the molded unit is slipped over the projecting end of leaf 11 and the lower projecting shank 21 is passed through registering holes 31, 32 and 33 in the seat member 30 and leaf 11. A lock washer 34 and nut 35 is applied to shank 21, by which means the shackle 15, the metal seat 30, and the spring leaf 11 are very firmly clamped together. Preferably the lower plate 36 of the U-shaped seat 30 is cut off shorter than the upper plate 37 thereof in order to permit the second leaf 13 of spring 12 to extend partially under the upper plate 37 and the shackle 15 and so reinforce the long leaf. It will be obvious also that the two plates 36 and 37 substantially reinforce the projecting end of leaf 11 where it is pierced by the hole 32 and so eliminates possibility of the spring leaf snapping at this weakened section.

Furthermore, by providing the seat 30 with a greater width than the leaf 11 the lateral width of the molded unit 15 may be made as great as good design dictates since it will not be limited by the width of leaf 11. Of course the upper seat 10 can easily be made of the desired width corresponding to that of the unit 15.

Figure 2:
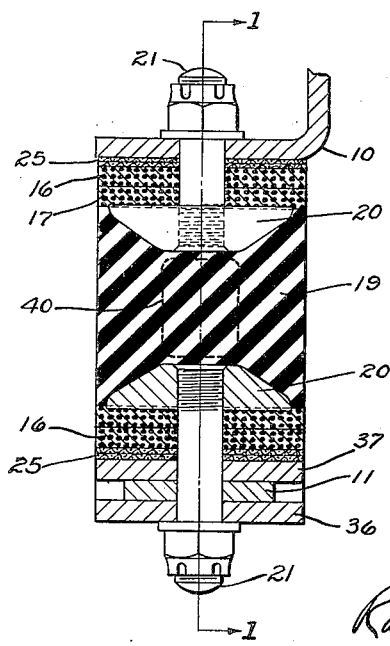
Fig. 2 is a transverse section taken on line 2—2 of Fig. 1.

The upper shank 21 is passed through a hole 22 in the upper seat 10 and has a lock washer 23 and nut 24 applied thereto and tightened to firmly clamp the upper portion of casing 16 and tension web 17 to the member 10. Preferably the hole 22 is so located relative to the hole 32 in the spring leaf 11 that these holes will be in substantial vertical alignment when spring 12 is deflected by the normal or average load thereupon. This position is illustrated in Fig. 1.

In operation, the flexible casing 16 retains the elastic rubber 18 and 19 in shape to withstand compressive loads upon the shackle. The spring end is permitted to move to and fro by a rolling distortion of the molded unit 15, which rolling distortion will not be materially resisted by the flexible web 17. On rebound, the web 17 will take all tension loads upon the shackle. It is also obvious that web 17 will prevent any material relative lateral movement between the spring end 11 and the chassis side rail. Thus the molded unit will not tend to lie over on its side under any conditions of use.

While the form of embodiment of the present invention as herein disclosed, constitutes a preferred form, it is to be understood that other forms might be adopted, all coming within the scope of the claims which follow.

What is claimed is as follows:

1. An extension shackle connecting two relatively movable members, said shackle comprising: a flexible rubberized fabric casing having opposite portions connected respectively to said movable members, an elastic soft rubber block within said casing and vulcanized thereto, and a flexible rubberized fabric tension web extending through said rubber block and having its ends secured to said movable members respectively.

2. An extension shackle connecting two relatively movable members, said shackle comprising: a flexible rubberized fabric casing having opposite portions connected respectively to said movable members, an elastic soft rubber block within said casing and vulcanized thereto, and a flexible textile cord tension member interconnecting said movable members and extending through said rubber block.

3. An extension shackle connecting two relatively movable members, said shackle comprising: a flexible rubberized fabric casing having opposite portions connected respectively to said movable members, an elastic soft rubber block within said casing and vulcanized thereto, and a flexible textile cord tension member interconnecting said movable members and extending through said rubber block, said tension member having the cords theereof extending substantially in the direction of the tensile forces applied to said shackle.

4. An extension shackle connecting two relatively movable members, said shackle comprising: a flexible rubberized fabric casing having opposite portions connected respectively to said movable members, an elastic soft rubber block within said casing and vulcanized thereto, and a flexible web extending through said rubber block and having the ends thereof secured to said movable members.

5. An extension shackle connecting two relatively movable members, said shackle comprising: a flexible rubberized fabric casing having opposite portions connected respectively to said movable members, an elastic soft rubber block within said casing and vulcanized thereto, and a flexible web extending through said rubber block and having the ends thereof secured to said movable members, and common means for securing the opposite portions of said flexible casing and the ends of said flexible web to said movable members respectively.

6. An extension shackle connecting two relatively movable members, comprising: a molded unit having a flexible textile casing vulcanized upon an interior elastic rubber block and a flexible textile web extending through said elastic block, means for securing said molded unit in between said relatively movable members in such manner that said casing and elastic block will take compressive loads and said flexible web will take tensile loads.

7. An extension shackle connecting two relatively movable members, comprising: a molded unit having a flexible textile casing vulcanized upon an interior elastic rubber block and a flexible textile web extending through said elastic block, a molded in situ metal clamping means on opposite sides of said molded unit for securing said casing and said flexible web to said movable members respectively.

8. An extension shackle connecting two relatively movable members, comprising: a molded rubber and textile unit having a flexible textile casing vulcanized upon an interior elastic rubber block, and a flexible textile tension web extending through the central portion of said rubber block, and common means for clamping said casing and said tension web to said movable members respectively.

9. An extension shackle connecting two relatively movable members, comprising: a molded rubber and textile unit having a flexible textile casing vulcanized upon an interior elastic rubber block, and a flexible textile tension web extending through the central portion of said rubber block, said tension web being formed by a continuation of said casing textile material.

10. An extension shackle connecting two relatively movable members, comprising: a molded rubber and textile unit having a flexible textile casing vulcanized upon an interior elastic rubber block, and a flexible textile tension web extending through the central portion of said rubber block, said textile casing and web being a continuous length of textile material coiled in a somewhat cylindrical shape to form said casing and having the interior end of said textile material extending across the rubber block to form said web.

11. An extension shackle connecting two relatively movable members, comprising: a molded rubber and textile unit having a flexible textile casing vulcanized upon an interior elastic rubber block, and a flexible textile tension web extending through the central portion of said rubber block, said textile casing and web being a continuous length of textile material coiled in a somewhat cylindrical shape to form said casing and having the interior end of said textile material extending across the rubber block to form said web, and molded in metal clamping inserts having shanks extending through apertures in said web and casing for clamping said web and casing to said movable members.

12. In combination, a leaf spring having a long leaf projecting beyond the second leaf thereof, a metal shackle seat member having an upper portion resting upon the end of said long leaf and having a lower portion extending around said leaf end and contacting the under side thereof, a shackle seated upon said upper portion and having a shank extending through an aperture in said leaf end and projecting below said lower portion, and a nut upon said shank for clamping said shackle, seat member, and leaf end together.

13. In combination, a leaf spring having a long leaf projecting beyond the second leaf thereof, a metal shackle seat member having an upper portion resting upon the end of said long leaf and having a lower portion extending around said leaf end and contacting the under side thereof, a shackle seated upon said upper portion and having a shank extending through an aperture in said leaf end and projecting below said lower portion, and a nut upon said shank for clamping said shackle, seat member and leaf end together, said upper portion partially overlying said second leaf whereby said long leaf is reinforced.

In testimony whereof I hereto affix my signature.

RALPH H. CHILTON.